(12) United States Patent
Naito

(10) Patent No.: US 10,615,443 B2
(45) Date of Patent: Apr. 7, 2020

(54) FUEL CELL SYSTEM

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 77 days.

(21) Appl. No.: 15/404,195

(22) Filed: Jan. 12, 2017

(65) Prior Publication Data
US 2017/0200967 A1    Jul. 13, 2017

(30) Foreign Application Priority Data
Jan. 13, 2016  (JP) .................... 2016-004228

(51) Int. Cl.
| | | |
|---|---|---|
| H01M 8/241 | (2016.01) | |
| H01M 8/2475 | (2016.01) | |
| H01M 8/0254 | (2016.01) | |
| H01M 8/0284 | (2016.01) | |
| H01M 8/2485 | (2016.01) | |
| H01M 8/1018 | (2016.01) | |

(52) U.S. Cl.
CPC ......... *H01M 8/241* (2013.01); *H01M 8/0254* (2013.01); *H01M 8/0284* (2013.01); *H01M 8/2475* (2013.01); *H01M 8/2485* (2013.01); *H01M 2008/1095* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 6,131,910 A | * | 10/2000 | Bagepalli | F01D 5/225 |
| | | | | 277/355 |
| 2014/0322626 A1 | * | 10/2014 | Naito | H01M 8/2475 |
| | | | | 429/467 |

FOREIGN PATENT DOCUMENTS

| | | | | |
|---|---|---|---|---|
| JP | 2006236611 | * | 9/2006 | ............. H01M 8/24 |
| JP | 2009-170169 | | 7/2009 | |

OTHER PUBLICATIONS

JP2006-236611 Machine Translation, Wakahoi, 09-06 (Year: 2006).*

* cited by examiner

*Primary Examiner* — Devina Pillay
(74) *Attorney, Agent, or Firm* — Mori & Ward, LLP

(57) ABSTRACT

A fuel cell system includes a fuel cell stack and a stack case. The fuel cell stack includes power generation cells, a first end and a second end, a first side and a second side, and a top side and a bottom side. The stack case contains the fuel cell stack therein. The stack case includes a first end plate, a second end plate, a first side plate, a second side plate, a top cover plate, a bottom cover plate, and sealing members. Each of the sealing members is disposed between the first side plate and the first end plate, between the first side plate and the second end plate, between the second side plate and the first end plate, and between the second side plate and the second end plate. Each of the sealing members includes an end portion. The end portion has a T-shape.

8 Claims, 8 Drawing Sheets

FUEL CELL SYSTEM

CROSS-REFERENCE TO RELATED APPLICATIONS

The present application claims priority under 35 U.S.C. § 119 to Japanese Patent Application No. 2016-004228, filed Jan. 13, 2016, entitled "Fuel Cell System." The contents of this application are incorporated herein by reference in their entirety.

BACKGROUND

1. Field

The present disclosure relates to a fuel cell system.

2. Description of the Related Art

For example, a solid polymer fuel cell includes a membrane electrode assembly (MEA), in which an anode electrode is disposed on one surface of an electrolyte membrane (polymer ion-exchange membrane) and a cathode electrode is disposed on the other surface of the electrolyte membrane. The membrane electrode assembly and separators, sandwiching the membrane electrode assembly, constitute a power generation cell. Typically, a predetermined number of such power generation cells are stacked and, for example, mounted in a fuel cell vehicle (such as a fuel cell electric automobile) as a vehicle fuel cell stack.

It is desirable that a vehicle fuel cell stack be reduced in size and weight. Japanese Unexamined Patent Application Publication No. 2009-170169, for example, describes a fuel cell developed to address this need. The fuel cell includes a fuel cell stack and a stack cover that covers the fuel cell stack. An insulating end plate supports at least one end of the fuel cell stack in the stacking direction, and the insulating end plate closes an opening in the stack cover is closed.

The insulating end plate, which closes the opening in the stack cover, serves as a part of a stack case and covers the fuel cell stack. It is described that, with such a structure, the outside dimensions of the fuel cell can be reduced and the fuel cell can be reduced in size and weight.

SUMMARY

According to one aspect of the present invention, a fuel cell system includes a fuel cell stack and a stack case. The fuel cell stack includes a plurality of power generation cells that are stacked. Each of the power generation cells generates electric power by causing an electrochemical reaction between a fuel gas and an oxidant gas. The stack case accommodates the fuel cell stack. The stack case includes a pair of end plates, a pair of side plates, an upper plate, and a lower plate. The pair of end plates are disposed at both ends of the fuel cell stack in a stacking direction in which the power generation cells are stacked. The pair of side plates are disposed along side surfaces of the fuel cell stack. The upper plate is disposed above the fuel cell stack. The lower plate is disposed below the fuel cell stack. A sealing member is disposed on a mating surface between each of the end plates and each of the side plates so as to extend in a vertical direction along the mating surface. The sealing member includes a T-shaped end portion a part of which protrudes from the mating surface toward an inner surface of the upper plate or the lower plate, and the T-shaped end portion has a T-shaped cross section along the mating surface.

According to another aspect of the present invention, a fuel cell system includes a fuel cell stack and a stack case. The fuel cell stack includes power generation cells, a first end and a second end, a first side and a second side, and a top side and a bottom side. The power generation cells are stacked in a stacking direction and configured to generate electric power via an electrochemical reaction between a fuel gas and an oxidant gas. The second end is opposite to the first end in the stacking direction. The second side is opposite to the first side in a side direction perpendicular to the stacking direction. The bottom side is opposite to the top side in a height direction perpendicular to the stacking direction and the side direction. The stack case contains the fuel cell stack therein. The stack case includes a first end plate, a second end plate, a first side plate, a second side plate, a top cover plate, a bottom cover plate, and sealing members. The first end plate is provided at the first end of the fuel cell stack. The second end plate is provided at the second end of the fuel cell stack. The first side plate is provided to be opposite to the first side of the fuel cell stack. The first side plate is connected to the first end plate at a first connection portion and to the second end plate at a second connection portion. The second side plate is provided to be opposite to the second side of the fuel cell stack. The second side plate is connected to the first end plate at a third connection portion and the second end plate at a fourth connection portion. The top cover plate is provided to be opposite to the top side of the fuel cell stack. The top cover plate is connected to the first end plate, the second end plate, the first side plate, and the second side plate. The bottom cover plate is provided to be opposite to the bottom side of the fuel cell stack. The bottom cover plate is connected to the first end plate, the second end plate, the first side plate, and the second side plate. Each of the sealing members is disposed between the first side plate and the first end plate at the first connection portion, between the first side plate and the second end plate at the second connection portion, between the second side plate and the first end plate at the third connection portion, and between the second side plate and the second end plate at the fourth connection portion. Each of the sealing members includes an end portion in a longitudinal direction thereof. The end portion has a T-shape and protruding toward the top cover plate or the bottom cover plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
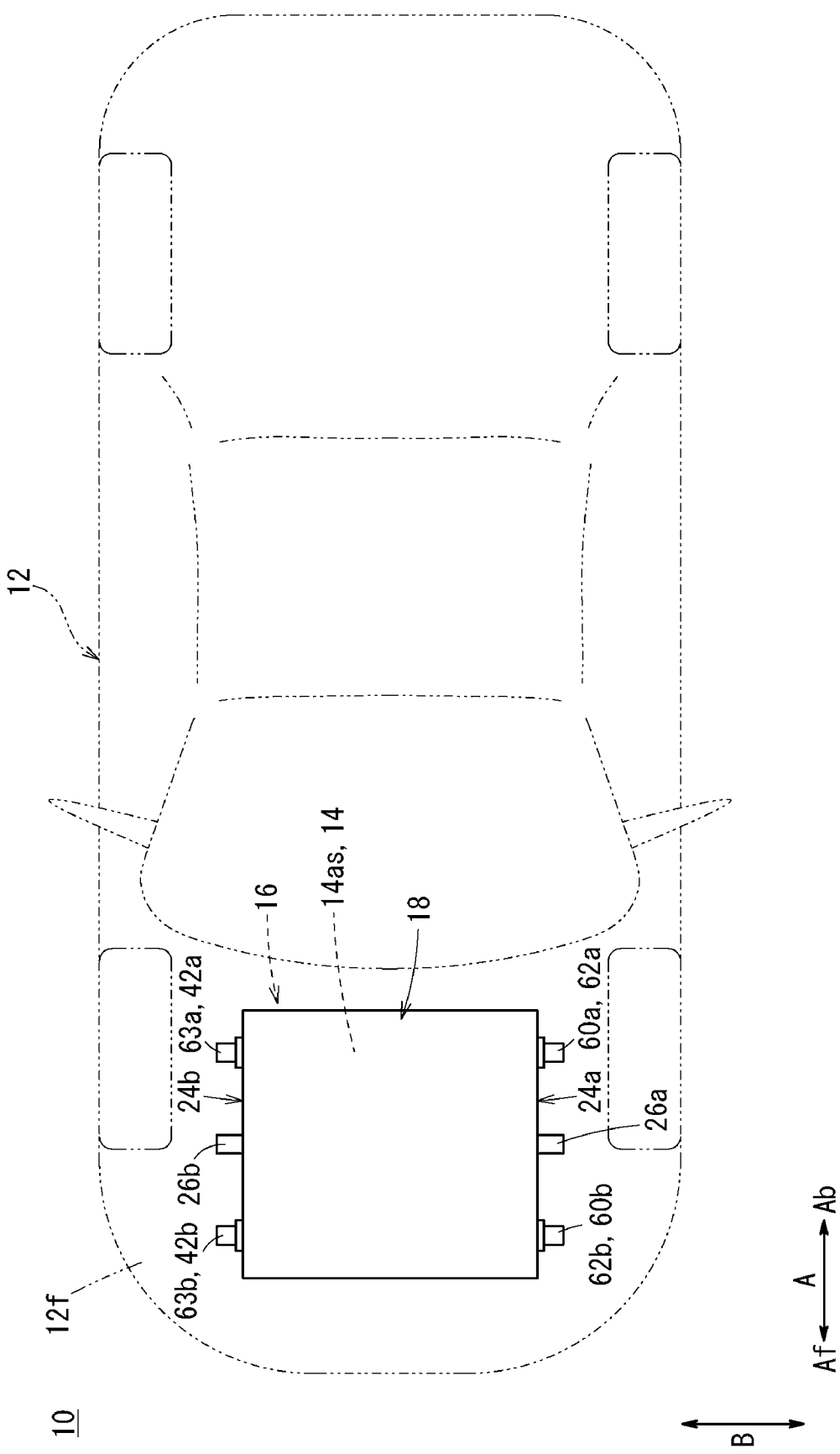
FIG. 1 is a schematic plan view of a fuel cell electric automobile including a fuel cell system according to an embodiment of the present disclosure.

The embodiments will now be described with reference to the accompanying drawings, wherein like reference numerals designate corresponding or identical elements throughout the various drawings.

Referring to FIG. 1, a fuel cell system 10 according to an embodiment of the present disclosure is mounted in a front box 12*f* (so-called motor compartment) of a fuel cell electric automobile 12 (fuel cell vehicle). Instead of in the front box 12*f*, the fuel cell system 10 may be disposed, for example, under a central part of the floor of the vehicle or near a rear trunk.

Figure 2:
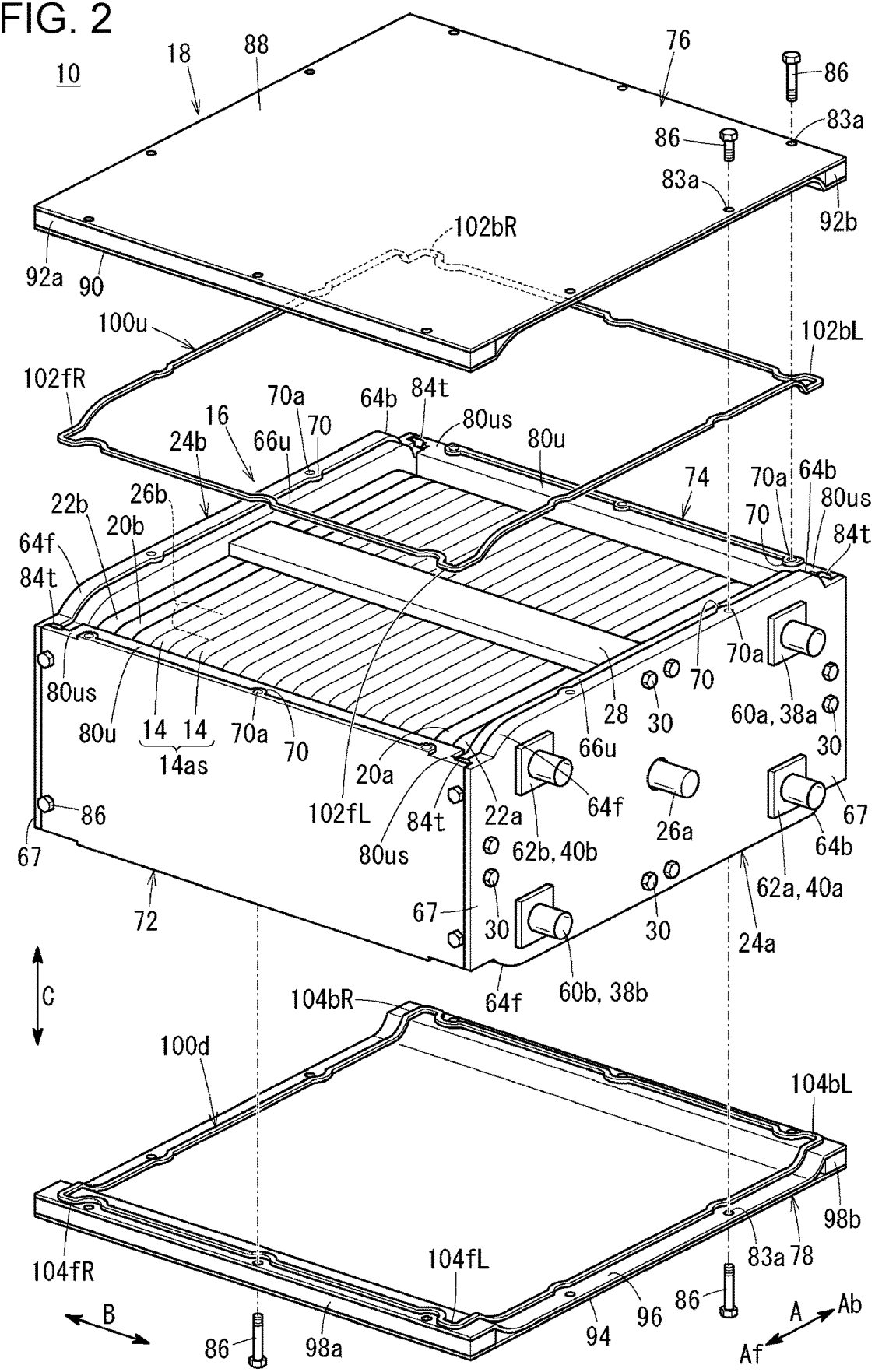
FIG. 2 is a partially exploded perspective view of a stack case of the fuel cell system.
Figure 3:
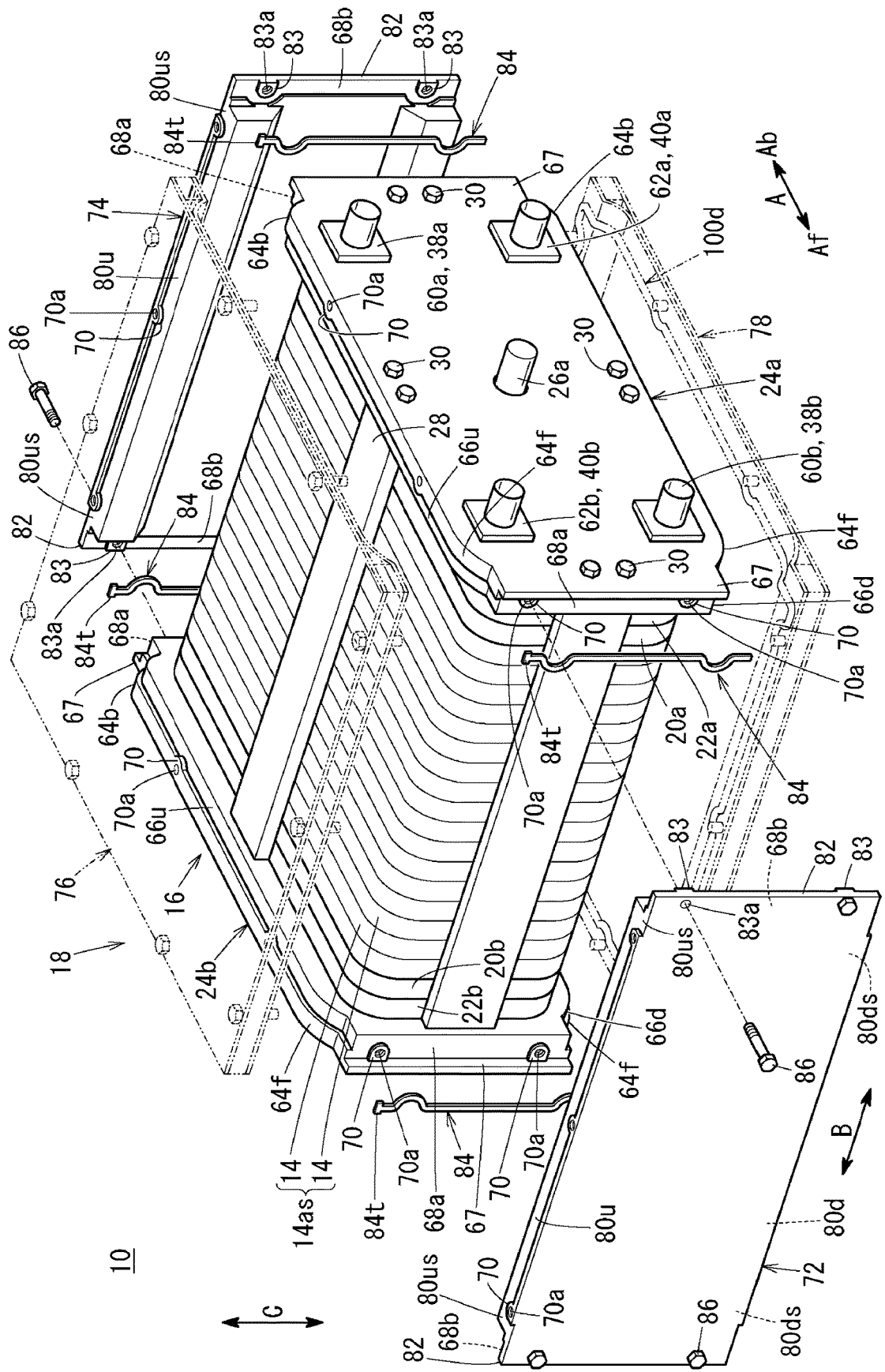
FIG. 3 is a partial exploded perspective view of the stack case of the fuel cell system.

The fuel cell system 10 includes a fuel cell stack 16, including a plurality of power generation cells 14 that are stacked, and a stack case 18, accommodating the fuel cell stack 16 (see FIGS. 2 and 3). The power generation cells 14, whose electrode surfaces are in upright positions, are stacked in the vehicle-width direction (direction of arrow B) of the fuel cell electric automobile 12, which crosses the vehicle-length direction (vehicle front-back direction) (direction of arrow A). Alternatively, the power generation cells 14 may be stacked in the vertical direction (vehicle-height direction) (direction of arrow C).

The power generation cells 14, which are stacked in the direction of arrow B, constitute a stacked body 14*as*. At one end of the stacked body 14*as* in the stacking direction, a first terminal plate 20*a*, a first insulation plate 22*a*, and a first end plate 24*a* are arranged outward. At the other end of the stacked body 14*as* in the stacking direction, a second terminal plate 20*b*, a second insulation plate 22*b*, and a second end plate 24*b* are arranged outward.

The first end plate 24*a* has a horizontally elongated shape (rectangular shape). A first electric power output terminal 26*a*, which is connected to the first terminal plate 20*a*, extends outward from a substantially central part (or from an off-center part) of the first end plate 24*a*. The second end plate 24*b* has a horizontally elongated shape (rectangular shape). A second electric power output terminal 26*b*, which is connected to the second terminal plate 20*b*, extends outward from a substantially central part (or from an off-center part) of the second end plate 24*b* (see FIG. 2).

Connection bars 28, each having a predetermined length, are disposed between edge portions of the first end plate 24*a* and the second end plate 24*b*. Each of the connection bars 28 connects central parts of the edge portions of the end plates 24*a* and 24*b*. Ends of the connection bars 28 are fixed to the first end plate 24*a* and the second end plate 24*b* with screws 30 so as to apply a fastening load to the stack of the power generation cells 14 (the stacked body 14*as*) in the stacking direction (direction of arrow B).

Figure 4:
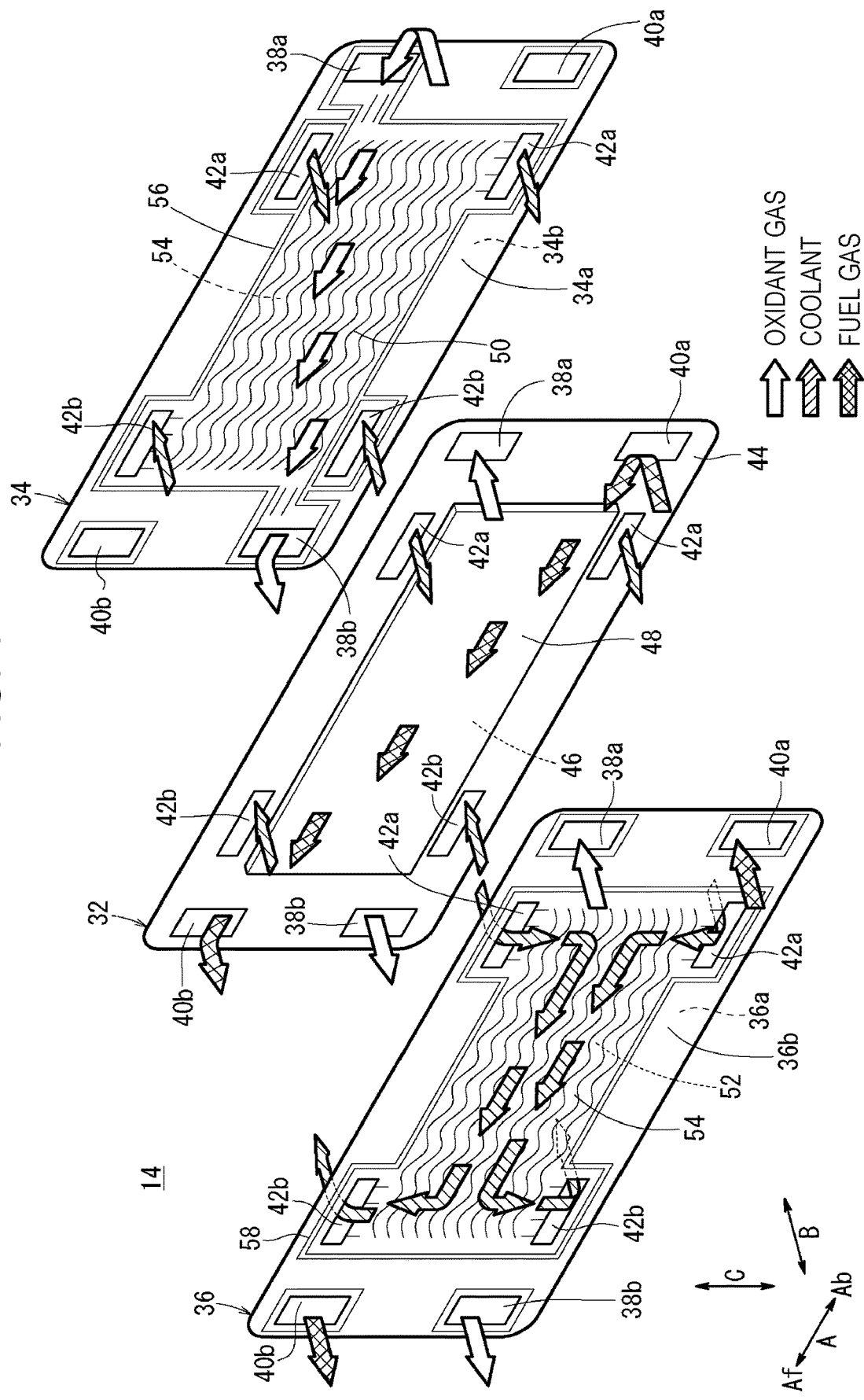
FIG. 4 is an exploded perspective view of a power generation cell included in a fuel cell stack.

Referring to FIG. 4, the power generation cell 14 includes a membrane electrode assembly 32 (MEA), and a cathode separator 34 and an anode separator 36 that sandwich the membrane electrode assembly 32. Each of the four corners of the power generation cell 14 has a curved shape.

Each of the cathode separator 34 and the anode separator 36 is made from, for example, a steel plate, a stainless steel plate, a titanium plate, an aluminum plate, a galvanized steel plate, or any of such metal plates whose surface is anticorrosive coated. Each of the cathode separator 34 and the anode separator 36, which is made by press-forming a thin metal plate so as to form a wave-like shape, has a rectangular shape in plan view and has an undulating shape in cross-sectional view. Instead of metal separators, for example, carbon separators may be used as the cathode separator 34 and the anode separator 36.

Each of the cathode separator 34 and the anode separator 36 has a horizontally elongated shape having long sides extending in a horizontal direction (direction of arrow A) and short sides extending in direction of gravity (direction of arrow C).

An oxidant gas supply manifold 38*a* and a fuel gas supply manifold 40*a* are formed in one end portion of the power generation cell 14 in the longitudinal direction (the direction of arrow A) so as to individually extend in the direction of arrow B. An oxidant gas, such as an oxygen-containing gas, is supplied through the oxidant gas supply manifold 38*a*. A fuel gas, such as a hydrogen-containing gas, is supplied through the fuel gas supply manifold 40*a*.

A fuel gas discharge manifold 40*b* and an oxidant gas discharge manifold 38*b* are formed in the other end portion of the power generation cell 14 in the longitudinal direction so as to individually extend in the direction of arrow B. The fuel gas is discharged through the fuel gas discharge manifold 40*b*. The oxidant gas is discharged through the oxidant gas discharge manifold 38*b*.

A pair of coolant supply manifolds 42*a* are formed in end portions of the power generation cell 14 in the transversal direction (the direction of arrow C) near the oxidant gas supply manifold 38*a* and the fuel gas supply manifold 40*a* (near one end in the horizontal direction). The pair of coolant supply manifolds 42*a*, through which a coolant is supplied, are formed in opposing upper and lower end portions of the power generation cell 14 so as to individually extend through the power generation cell 14 in the direction of arrow B.

A pair of coolant discharge manifolds 42*b* are formed in end portions of the power generation cell 14 in the transversal direction near the fuel gas discharge manifold 40*b* and the oxidant gas discharge manifold 38*b* (near the other end in the horizontal direction). The pair of coolant discharge manifolds 42*b*, through which a coolant is discharged, are formed in opposing upper and lower end portions of the power generation cell 14 so as to individually extend through the power generation cell 14 in the direction of arrow B.

The membrane electrode assembly 32 includes a solid polymer electrolyte membrane 44, and a cathode electrode 46 and an anode electrode 48 that sandwich the solid polymer electrolyte membrane 44. The solid polymer electrolyte membrane 44 is, for example, a thin film that is made of a perfluorosulfonic acid polymer including water.

The cathode electrode 46 and the anode electrode 48 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are formed on both sides of the solid polymer electrolyte membrane 44.

An oxidant gas channel 50, through which the oxidant gas supply manifold 38*a* is connected to the oxidant gas discharge manifold 38*b*, is formed on a surface 34*a* of the cathode separator 34 facing the membrane electrode assembly 32. The oxidant gas channel 50 includes a plurality of wave-shaped channel grooves (or linear channel grooves) extending in the direction of arrow A.

A fuel gas channel 52, through which the fuel gas supply manifold 40*a* is connected to the fuel gas discharge manifold 40*b*, is formed on a surface 36*a* of the anode separator 36 facing the membrane electrode assembly 32. The fuel gas channel 52 includes a plurality of wave-shaped channel grooves (or linear channel grooves) extending in the direction of arrow A. The oxidant gas and the fuel gas flow in the same direction through the oxidant gas channel 50 and the fuel gas channel 52, respectively. However, this is not a limitation. The oxidant gas and the fuel gas may flow in opposite directions.

A coolant channel 54, through which the coolant supply manifolds 42a are connected to the coolant discharge manifolds 42b, is formed between a surface 36b of the anode separator 36 and a surface 34b of the cathode separator 34 of an adjacent power generation cell 14. The coolant channel 54 extends in the horizontal direction and allows the coolant to flow through a region corresponding to the electrodes of the membrane electrode assembly 32.

A first sealing member 56 is integrally formed on the surfaces 34a and 34b of the cathode separator 34 so as to surround the other periphery of the cathode separator 34. A second sealing member 58 is integrally formed on the surfaces 36a and 36b of the anode separator 36 so as to surround the other periphery of the anode separator 36.

Each of the first sealing member 56 and the second sealing member 58 is made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Referring to FIGS. 2 and 3, an oxidant gas inlet manifold member 60a, an oxidant gas outlet manifold member 60b, a fuel gas inlet manifold member 62a, and a fuel gas outlet manifold member 62b are attached to the first end plate 24a. The oxidant gas inlet manifold member 60a and the oxidant gas outlet manifold member 60b are respectively connected to the oxidant gas supply manifold 38a and the oxidant gas discharge manifold 38b. The fuel gas inlet manifold member 62a and the fuel gas outlet manifold member 62b are respectively connected to the fuel gas supply manifold 40a and the fuel gas discharge manifold 40b.

Referring to FIG. 1, a coolant inlet manifold member 63a, which is connected to the pair of coolant supply manifolds 42a, is attached to the second end plate 24b. A coolant outlet manifold member 63b, which is connected to the pair of coolant discharge manifolds 42b, is attached to the second end plate 24b.

Referring to FIGS. 2 and 3, curved surfaces 64f, each of which is curved inward, are formed at upper and lower corners of a front end portion of the first end plate 24a in the vehicle-length direction. Curved surfaces 64b, each of which is curved inward, are formed at upper and lower corners of a rear end portion of the first end plate 24a in the vehicle-length direction. The curved surfaces 64f and the curves surfaces 64b have different radii of curvature. However, the curved surfaces 64f and 64b may have the same radius of curvature.

The first end plate 24a includes an upper groove portion 66u, which is formed in an inner part (close to the stacked body 14as) of the upper surface of the first end plate 24a so as to extend over the entire length of the upper surface in the direction of arrow A. The first end plate 24a includes a lower groove portion 66d, which is formed in an inner part (close to the stacked body 14as) of the lower surface of the first end plate 24a so as to extend over the entire length of the lower surface in the direction of arrow A.

The first end plate 24a includes thin protruding portions 67, which are formed at both end portions (along both short sides) thereof in the direction of arrow A so as to protrude outward. The first end plate 24a has sealing surfaces 68a, which are formed inside of (at a position closer to the stacked body 14as than) the thin protruding portions 67. The sealing surfaces 68a face a front side plate 72 and a rear side plate 74 (described below) and vertically extend along a plane. A plurality of boss portions 70 are formed on the outer peripheral surface of the first end plate 24a, and tapped holes 70a are formed in the boss portions 70.

The second end plate 24b has the same structure as the first end plate 24a. Elements of the second end plate 24b that are the same as those of the first end plate 24a will be denoted by the same numerals and detailed descriptions of such elements will be omitted.

The first end plate 24a and the second end plate 24b form two sides (surfaces) of the stack case 18 at both ends in the vehicle-width direction (direction of arrow B). The front side plate 72 and the rear side plate 74, which have horizontally elongated plate-like shapes, form two sides (surfaces) of the stack case 18 at both ends in the vehicle-length direction (direction of arrow A). An upper plate 76 and a lower plate 78 form two sides (surfaces) of the stack case 18 at both ends in the vehicle-height direction (direction of arrow C). The upper and lower plates 76 and 78 have horizontally elongated plate-like shapes.

The stack case 18 may further include a pair of end plates that are made of materials different from those of the first end plate 24a and the second end plate 24b. In this case, the pair of end plates are disposed outside of the first end plate 24a and the second end plate 24b.

The front side plate 72 and the rear side plate 74 are made by extrusion, casting, machining, or the like. The front side plate 72 has a horizontally elongated plate-like and is disposed in a vertical position.

Figure 5:
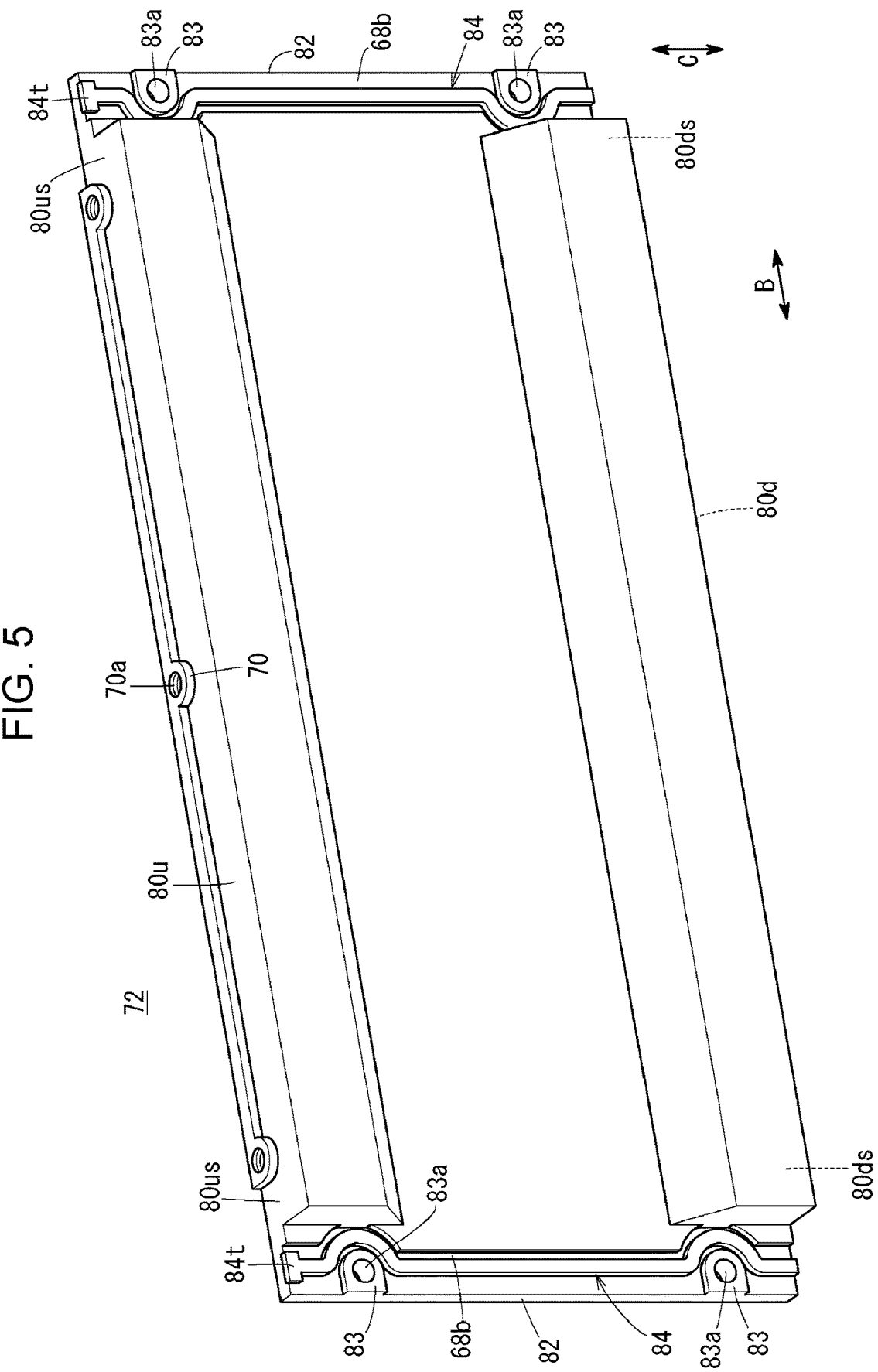
FIG. 5 is a perspective view of a front side plate of the stack case.

Referring to FIG. 5, the front side plate 72 includes an upper groove portion 80u, which is formed in an inner part (close to the stacked body 14as) of the upper surface of the front side plate 72 so as to extend over the entire length of the upper surface in the direction of arrow B. Wide flat surfaces 80us are formed at both ends of the upper groove portion 80u in the direction of arrow B. The front side plate 72 includes a lower groove portion 80d, which is formed in an inner part (close to the stacked body 14as) of the lower surface of the front side plate 72 so as to extend over the entire length of the lower surface in the direction of arrow B, in a similar way as the upper groove portion 80u does. Wide flat surfaces 80ds are formed at both ends of the lower groove portion 80d in the direction of arrow B.

Referring to FIG. 5, the front side plate 72 includes thin portions 82, which are formed at both end portions (along both short sides) thereof in the direction of arrow B. The thin portions 82 have sealing surfaces 68b that face the stacked body 14as. The sealing surfaces 68b vertically extend along a plane. Boss portions 83 are formed on the thin portions 82, and the sealing surface 68b includes curved portions that are formed in upper and lower parts thereof that do not overlap the boss portions 83. The boss portions 83 contact the boss portion 70, which are formed on the short sides of the first end plate 24a and the second end plate 24b. The boss portions 83 have holes 83a that are coaxial with the tapped holes 70a of the boss portions 70.

The sealing surfaces 68a of the first end plate 24a and the second end plate 24b and the sealing surfaces 68b of the front side plate 72 face each other and form mating surfaces. Sealing members 84, which extend vertically, are disposed on the mating surfaces. Each of the sealing members 84 has a rectangular (or a square) cross section and includes a T-shaped end portion 84t in an upper part thereof. A lower part of the sealing member 84 has a linear shape. However, as with the upper part, the lower part of the sealing member 84 may include the T-shaped end portion 84t.

Figure 6:
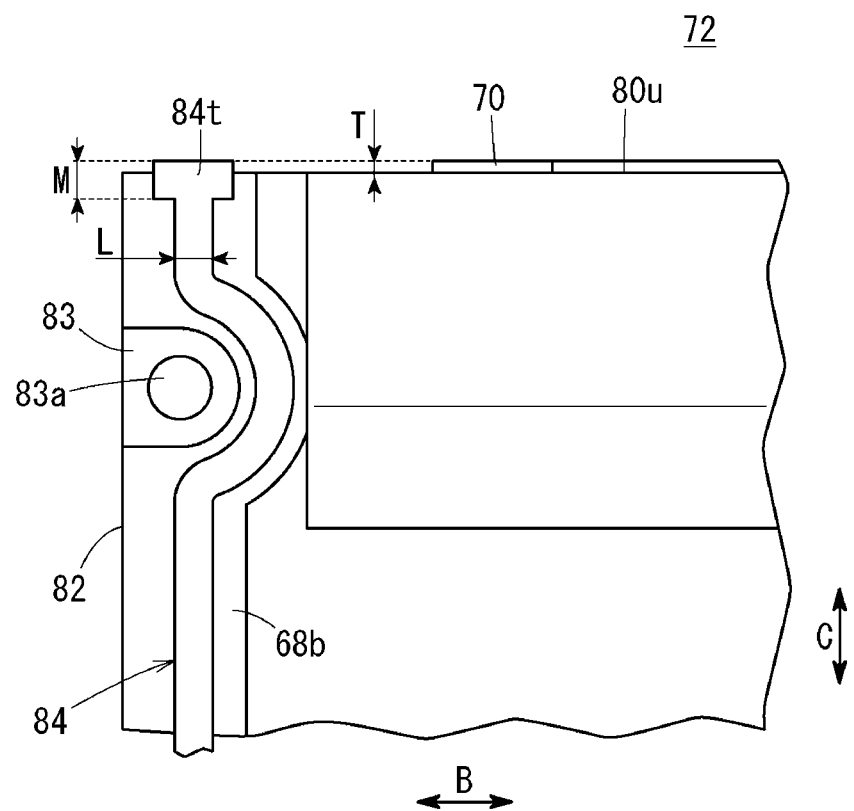
FIG. 6 is a partial enlarged view of the front side plate.

Referring to FIG. 6, the T-shaped end portion 84t has a T-shaped cross section along the mating surface. The width L of the T-shaped end portion 84t in a horizontal direction is equal to the width M of the T-shaped end portion 84t in the vertical direction. The T-shaped end portion 84t protrudes from the upper end of the mating surface (the upper groove portion 80u) by a length T.

Referring to FIGS. 2 and 3, the boss portions 70, having the tapped holes 70a, are formed in each of the upper surface and the lower surface of the front side plate 72. Bolts 86 are inserted into the holes 83a, which are formed in the vertical surface of the front side plate 72. The bolts 86 are screwed into the tapped holes 70a, which are formed in side surfaces of the first end plate 24a and the second end plate 24b (see FIG. 3).

Referring to FIG. 3, the rear side plate 74 has a horizontally elongated plate-like shape and is disposed in a vertical position. The rear side plate 74 has the same structure as the front side plate 72. Elements of the rear side plate 74 that are the same as those of the front side plate 72 will be denoted by the same numerals and detailed descriptions of such elements will be omitted.

Referring to FIG. 2, the upper plate 76 includes an outer plate 88 and an inner plate 90, which are a pair of pressed plates (press-formed plates) that are joined to each other. Rectangular column members 92a and 92b are disposed between the outer plate 88 and the inner plate 90 so as to correspond to both end portions (in the direction of arrow A) of the plates 88 and 90, which extend in the stacking direction (direction of arrow B). The width of the rectangular column member 92a in the direction of arrow A is larger than that of the rectangular column member 92b, but may be equal to that of the rectangular column member 92b.

The inner plate 90 forms an inner peripheral surface of the stack case 18; has a thin-plate like shape; and has a curved shape, a bent shape, or both of curved and bent shapes along the outer shape of the power generation cells 14. The outer plate 88 and the inner plate 90 are fixed to each other by MIG welding, TIG welding, or the like.

The lower plate 78 includes an outer plate 94 and an inner plate 96, which are a pair of pressed plates (press-formed plates) that are joined to each other. Rectangular column members 98a and 98b are disposed between the outer plate 94 and the inner plate 96 so as to correspond to both end portions (in the direction of arrow A) of the plates 94 and 96, which extend in the stacking direction (direction of arrow B). The width of the rectangular column member 98a in the direction of arrow A is larger than that of the rectangular column member 98b, but may be equal to that of the rectangular column member 98b.

The inner plate 96 forms an inner peripheral surface of the stack case 18; has a thin-plate like shape; and has a curved shape, a bent shape, or both of curved and bent shapes along the outer shape of the power generation cells 14. The outer plate 94 and the inner plate 96 are fixed to each other by MIG welding, TIG welding, or the like.

An upper sealing member 100u (rectangular sealing member), which is rectangular-loop-shaped, is disposed between the upper plate 76 and the first and second end plates 24a and 24b and between the upper plate 76 and the front and rear side plates 72 and 74.

Figure 7:
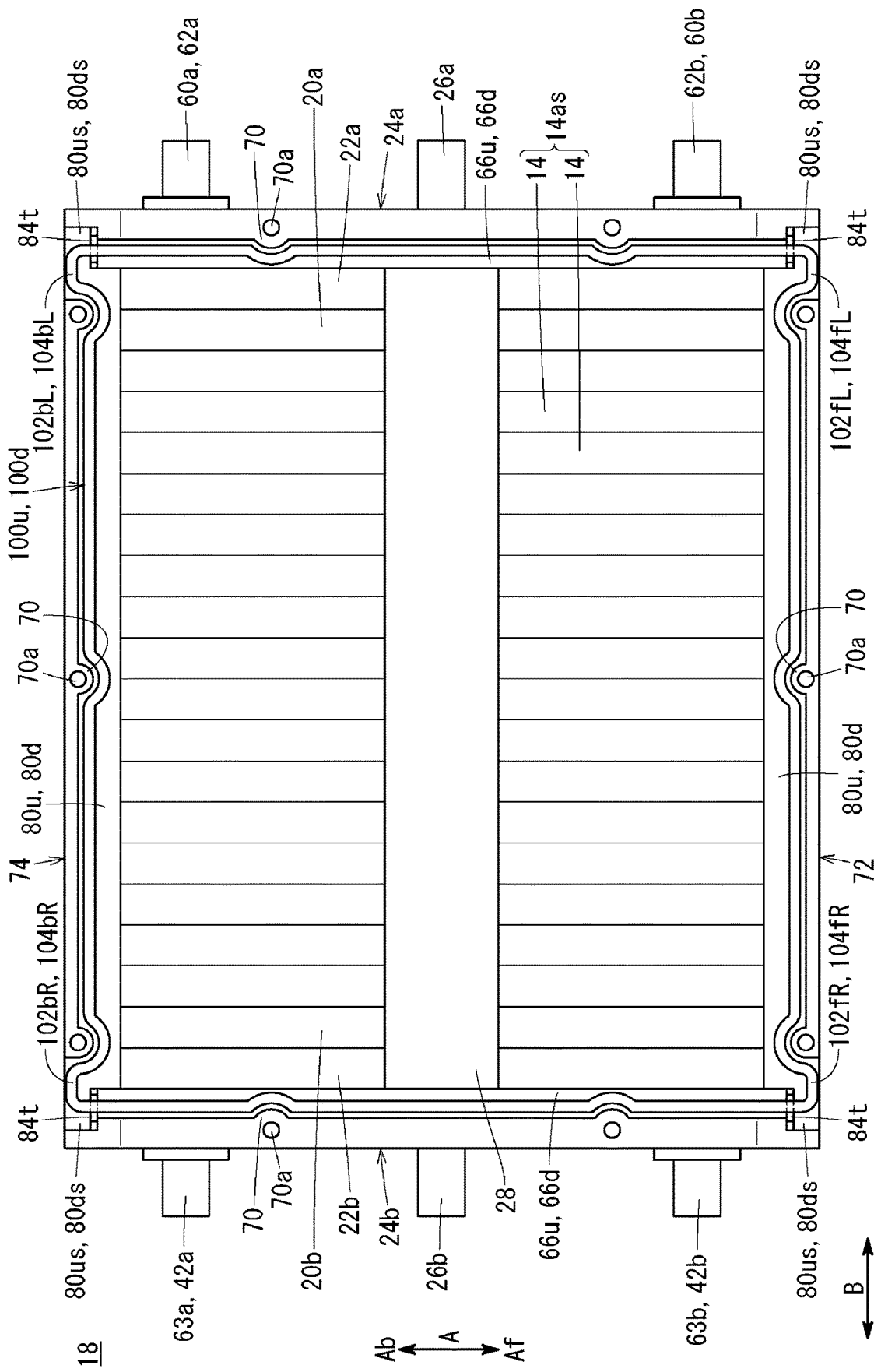
FIG. 7 is a partial top view of the stack case.

Referring to FIGS. 2 and 7, the upper sealing member 100u is disposed in the upper groove portions 66u of the first end plate 24a and the second end plate 24b and in the upper groove portions 80u of the front side plate 72 and the rear side plate 74. The upper sealing member 100u has a quadrangular cross-sectional shape (or a circular cross-sectional shape). The upper sealing member 100u includes extension portions 102fR, 102fL, 102bR, and 102bL for length adjustment, which are disposed at the four corners of the upper sealing member 100u.

The extension portions 102fR, 102fL, 102bR, and 102bL have curved shapes that protrude outward at the corners. The extension portions 102fR, 102fL, 102bR, and 102bL have shapes that differ from each other. However, the extension portions 102fR, 102fL, 102bR, and 102bL may have the same shape.

In accordance with the shape of a portion of the stack case 18 to be sealed, the upper sealing member 100u may have at least one of the extension portions 102fR, 102fL, 102bR, and 102bL. For example, only the extension portions 102fR and 102bL may be formed at one pair of opposing corners. Also for a lower sealing member 100d described below, the positions and the number of extension portions may be changed as appropriate. Only one of the upper sealing member 100u and the lower sealing member 100d may have at least one extension portion.

The extension portions 102fL and 102fR are formed near an end of the upper sealing member 100u in the direction of arrow Af and disposed on the flat surfaces 80us at the ends of the first end plate 24a and the second end plate 24b in the direction of arrow Af. The extension portions 102bL and 102bR are formed near an end of the upper sealing member 100u in the direction of arrow Ab and disposed on the flat surfaces 80us at the ends of the first end plate 24a and the second end plate 24b in the direction of arrow Ab. Each of the extension portions 102fR, 102fL, 102bR, and 102bL contacts an end surface of the T-shaped end portion 84t of a corresponding one of the sealing members 84 (see FIGS. 7 and 8).

Referring to FIG. 2, the lower sealing member 100d (rectangular sealing member), which is rectangular-loop-shaped, is disposed between the lower plate 78 and the first and second end plates 24a and 24b and between the lower plate 78 and the front and rear side plates 72 and 74.

Referring to FIG. 7, the lower sealing member 100d is disposed in the lower groove portions 66d of the first end plate 24a and the second end plate 24b and in the lower groove portions 80d of the front side plate 72 and the rear side plate 74. The lower sealing member 100d has a quadrangular cross-sectional shape (or a circular cross-sectional shape). The lower sealing member 100d includes extension portions 104fR, 104fL, 104bR, and 104bL for length adjustment, which are disposed at the four corners of the lower sealing member 100d.

The extension portions 104fR, 104fL, 104bR, and 104bL have curved shapes that protrude outward at the corners. The extension portions 104fR, 104fL, 104bR, and 104bL have shapes that differ from each other. However, the extension portions 104fR, 104fL, 104bR, and 104bL may have the same shape.

The extension portions 104fL and 104fR are formed near an end of the lower sealing member 100d in the direction of arrow Af and disposed on the flat surfaces 80ds at the ends of the first end plate 24a and the second end plate 24b in the direction of arrow Af. The extension portions 104bL and 104bR are formed near an end of the lower sealing member 100d in the direction of arrow Ab and disposed on the flat surfaces 80ds at the ends of the first end plate 24a and the second end plate 24b in the direction of arrow Ab.

Referring to FIG. 2, the holes 83a are formed in each of the upper plate 76 and the lower plate 78. When the bolts 86 are inserted into the holes 83a and screwed into the tapped holes 70a, the components of the stack case 18 are fixed to each other and fixed to the first end plate 24a and the second end plate 24b.

An operation of the fuel cell system 10, having the structure described above, will be described.

Referring to FIGS. 2 and 3, an oxidant gas, such as an oxygen-containing gas, is supplied from the oxidant gas inlet manifold member 60a on the first end plate 24a to the oxidant gas supply manifold 38a. A fuel gas, such as a hydrogen-containing gas, is supplied from the fuel gas inlet manifold member 62a on the first end plate 24a to the fuel gas supply manifold 40a.

Referring to FIG. 1, a coolant, such as pure water, ethylene glycol, or oil, is supplied from the coolant inlet manifold member 63a on the second end plate 24b to the pair of coolant supply manifolds 42a.

Referring to FIG. 4, the oxidant gas flows from the oxidant gas supply manifold 38a into the oxidant gas channel 50 of the cathode separator 34. The oxidant gas flows along the oxidant gas channel 50 in the direction of arrow A, and is supplied to the cathode electrode 46 of the membrane electrode assembly 32.

The fuel gas is supplied from the fuel gas supply manifold 40a to the fuel gas channel 52 of the anode separator 36. The fuel gas flows along the fuel gas channel 52 in the direction of arrow A, and is supplied to the anode electrode 48 of the membrane electrode assembly 32.

In the membrane electrode assembly 32, the oxidant gas supplied to the cathode electrode 46 and the fuel gas supplied to the anode electrode 48 are consumed in electrochemical reactions in the electrode catalyst layers, and thereby electric power is generated. The electric power generated by the fuel cell system 10 is used to drive the fuel cell electric automobile 12.

The oxidant gas supplied to the cathode electrode 46 of the membrane electrode assembly 32 and partially consumed is discharged along the oxidant gas discharge manifold 38b in the direction of arrow B. The fuel gas supplied to the anode electrode 48 of the membrane electrode assembly 32 and partially consumed is discharged along the fuel gas discharge manifold 40b in the direction of arrow B.

The coolant supplied to the pair of coolant supply manifolds 42a flows into the coolant channel 54 between the cathode separator 34 and the anode separator 36. The coolant temporarily flows inward in the direction of arrow C and cools the membrane electrode assembly 32 while flowing in the direction of arrow A. The coolant flows outward in the direction of arrow C and is discharged along the pair of coolant discharge manifolds 42b in the direction of arrow B.

In the present embodiment, referring to FIGS. 3 and 5, the sealing surfaces 68a of the first end plate 24a and the second end plate 24b and the sealing surfaces 68b of the front side plate 72 face each other and form mating surfaces. The sealing members 84, which extend vertically, are disposed on the mating surfaces, and each of the sealing members 84 includes the T-shaped end portion 84t in an upper part thereof.

Figure 8:
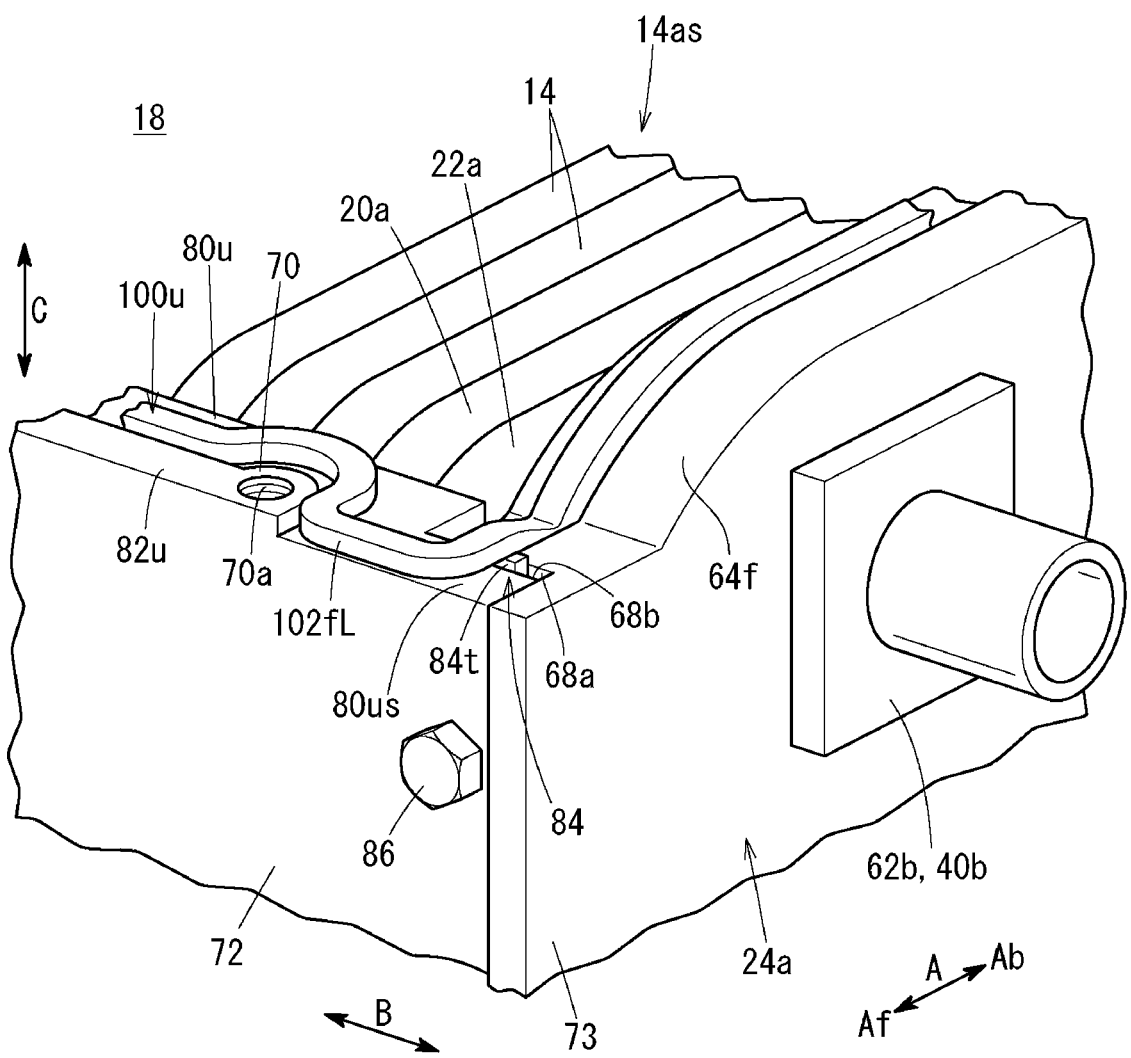
FIG. 8 is a partial enlarged perspective view of the stack case.

The T-shaped end portion 84t of the sealing member 84 protrudes upward from the mating surface and contacts the inner surface of the upper plate 76, more specifically, the sealing member 100u, and thereby elastically deforms (see FIG. 8). Therefore, the sealing member 84 and the upper sealing member 100u (the inner surface of the upper plate 76) can be in close contact with each other over a comparatively large area, so that leakage of the fuel gas from the inside to the outside of the stack case 18 can be reliably prevented. Accordingly, an advantage is obtained in that the stack case 18 can be hermetically sealed with a simple and economical structure.

Referring to FIG. 6, the T-shaped end portion 84t has a T-shaped cross section along the mating surface. The width L of the T-shaped end portion 84t in a horizontal direction is equal to the width M of the T-shaped end portion 84t in the vertical direction. Thus, the entirety of each of the sealing members 84 receives a uniform surface pressure when the sealing member 84 is disposed and compressed between the sealing surface 68a of a corresponding one of the first end plate 24a and the second end plate 24b and a corresponding one of the sealing surfaces 68b of the front side plate 72. Therefore, it is possible to prevent leakage of, in particular, the fuel gas.

The rear side plate 74 provides the same advantages as the front side plate 72.

According to the present disclosure, a fuel cell system includes a fuel cell stack including a plurality of power generation cells that are stacked, each of the power generation cells generating electric power by causing an electrochemical reaction between a fuel gas and an oxidant gas; and a stack case that accommodates the fuel cell stack.

The stack case includes a pair of end plates that are disposed at both ends of the fuel cell stack in a stacking direction in which the power generation cells are stacked. The stack case further includes a pair of side plates that are disposed along side surfaces of the fuel cell stack, an upper plate that is disposed above the fuel cell stack, and a lower plate that is disposed below the fuel cell stack.

In the fuel cell system, a sealing member is disposed on a mating surface between each of the end plates and each of the side plates so as to extend in a vertical direction along the mating surface. The sealing member includes a T-shaped end portion a part of which protrudes from the mating surface toward an inner surface of the upper plate or the lower plate, and the T-shaped end portion has a T-shaped cross section along the mating surface.

Preferably, in the fuel cell system, a width of the T-shaped end portion in a horizontal direction is equal to a width of the T-shaped end portion in a vertical direction.

Preferably, in the fuel cell system, a rectangular sealing member, which has a rectangular loop shape, is disposed between the upper plate and the pair of end plates and between the upper plate and the pair of side plates or is disposed between the lower plate and the pair of end plates and between the lower plate and the pair of side plates. In this case, preferably, the rectangular sealing member overlaps the T-shaped end portion of the sealing member.

With the present disclosure, the T-shaped end portion of the sealing member protrudes upward from the mating surface and contacts the inner surface of the upper plate or the lower plate, and thereby elastically deforms. Therefore, the sealing member and the inner surface of the upper plate or the lower plate can be in close contact with each other over a comparatively large area, so that leakage of the fuel gas from the inside to the outside of the stack case can be reliably prevented. Accordingly, the stack case can be hermetically sealed with a simple and economical structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
a fuel cell stack including a plurality of power generation cells that are stacked, each of the power generation cells generating electric power by causing an electrochemical reaction between a fuel gas and an oxidant gas; and
a stack case that accommodates the fuel cell stack, the stack case including
a pair of end plates that are disposed at both ends of the fuel cell stack in a stacking direction in which the power generation cells are stacked,
a pair of side plates that are disposed along side surfaces of the fuel cell stack,
an upper plate that is disposed above the fuel cell stack, and
a lower plate that is disposed below the fuel cell stack,
wherein a sealing member is disposed on a mating surface between each of the end plates and each of the side plates so as to extend in a vertical direction along the mating surface,
wherein the sealing member includes a T-shaped end portion a part of which protrudes from the mating surface toward an inner surface of the upper plate or the lower plate, and the T-shaped end portion has a T-shaped cross section along the mating surface,
wherein the T-shaped cross section comprises:
a crossbar provided at an end of the sealing member in the vertical direction; and
a vertical bar extending inwardly from the crossbar along the vertical direction,
wherein a rectangular sealing member, which has a rectangular loop shape, is disposed between the upper plate and the pair of end plates and between the upper plate and the pair of side plates or is disposed between the lower plate and the pair of end plates and between the lower plate and the pair of side plates,
wherein the rectangular sealing member overlaps the T-shaped end portion of the sealing member, and
wherein a part of the crossbar protrudes from the mating surface in the vertical direction to be in direct contact with the inner surface of the upper plate or the lower plate.

2. The fuel cell system according to claim 1,
wherein a width of the T-shaped end portion in a horizontal direction is equal to a width of the T-shaped end portion in a vertical direction.

3. The fuel cell system according to claim 1,
wherein each end plate of the pair of end plates further includes a plurality of holes for receiving fasteners and a groove portion formed on a surface of each end plate of the pair of end plates inside of the plurality of holes,
wherein each side plate of the pair of side plates further includes a plurality of holes for receiving fasteners, and
wherein the rectangular sealing member is located in the groove portion on each end plate of the pair of end plates.

4. The fuel cell system according to claim 1,
wherein the part of the crossbar that protrudes from the mating surface in the vertical direction directly contacts the rectangular sealing member.

5. A fuel cell system comprising:
a fuel cell stack comprising:
power generation cells stacked in a stacking direction and configured to generate electric power via an electrochemical reaction between a fuel gas and an oxidant gas;
a first end and a second end opposite to the first end in the stacking direction;
a first side and a second side opposite to the first side in a side direction perpendicular to the stacking direction; and
a top side and a bottom side opposite to the top side in a height direction perpendicular to the stacking direction and the side direction; and
a stack case containing the fuel cell stack therein and comprising:
a first end plate provided at the first end of the fuel cell stack;
a second end plate provided at the second end of the fuel cell stack;
a first side plate provided to be opposite to the first side of the fuel cell stack and connected to the first end plate at a first connection portion and to the second end plate at a second connection portion;
a second side plate provided to be opposite to the second side of the fuel cell stack and connected to the first end plate at a third connection portion and the second end plate at a fourth connection portion;
a top cover plate provided to be opposite to the top side of the fuel cell stack and connected to the first end plate, the second end plate, the first side plate, and the second side plate;
a bottom cover plate provided to be opposite to the bottom side of the fuel cell stack and connected to the first end plate, the second end plate, the first side plate, and the second side plate; and
sealing members each disposed between the first side plate and the first end plate at the first connection portion, between the first side plate and the second end plate at the second connection portion, between the second side plate and the first end plate at the third connection portion, and between the second side plate and the second end plate at the fourth connection portion, each of the sealing members including an end portion in a longitudinal direction thereof, the end portion having a T-shape and protruding toward the top cover plate or the bottom cover plate,
wherein the T-shape comprises:
a crossbar provided at an end of the end portion in the longitudinal direction; and
a vertical bar extending inwardly from the crossbar along the longitudinal direction,
wherein a rectangular sealing member, which has a rectangular loop shape, is disposed between the top cover plate and the first end plate, between the top cover plate and the second end plate, between the top cover plate and the first side plate, and between the top cover plate and the second side plate or is disposed between the bottom cover plate and the first end plate, between the bottom cover plate and the second end plate, between the bottom cover plate and the first side plate, and between the bottom cover plate and the second side plate,
wherein the rectangular sealing member overlaps the end portion of the sealing member, and
wherein a part of the crossbar protrudes in the longitudinal direction to be in direct contact with the top cover plate or the bottom cover plate.

6. The fuel cell system according to claim 5,
wherein a width of the end portion in a horizontal direction is equal to a width of the end portion in a vertical direction.

7. The fuel cell system according to claim 5,
wherein each of the first end plate and the second end plate includes a plurality of holes for receiving fasteners and a groove portion formed on a surface of each of the first end plate and the second end plate inside of the plurality of holes,
wherein the first side plate and the second side plate each further includes a plurality of holes for receiving fasteners, and
wherein the rectangular sealing member is located in the groove portion on each of the first end plate and the second end plate.

8. The fuel cell system according to claim 5,
wherein the part of the crossbar that protrudes in the longitudinal direction directly contacts the rectangular sealing member.

* * * * *